Dec. 25, 1962  A. J. TAYLOR ET AL  3,070,536
PLANT INCLUDING NUCLEAR REACTOR
Filed Aug. 27, 1959  2 Sheets-Sheet 1

Inventors
Anthony J. Taylor
Norman G. Worley
By
Pennie, Edmonds, Morton, Barrows & Taylor
Attorneys Dec. 25, 1962  A. J. TAYLOR ET AL  3,070,536
PLANT INCLUDING NUCLEAR REACTOR
Filed Aug. 27, 1959  2 Sheets-Sheet 2
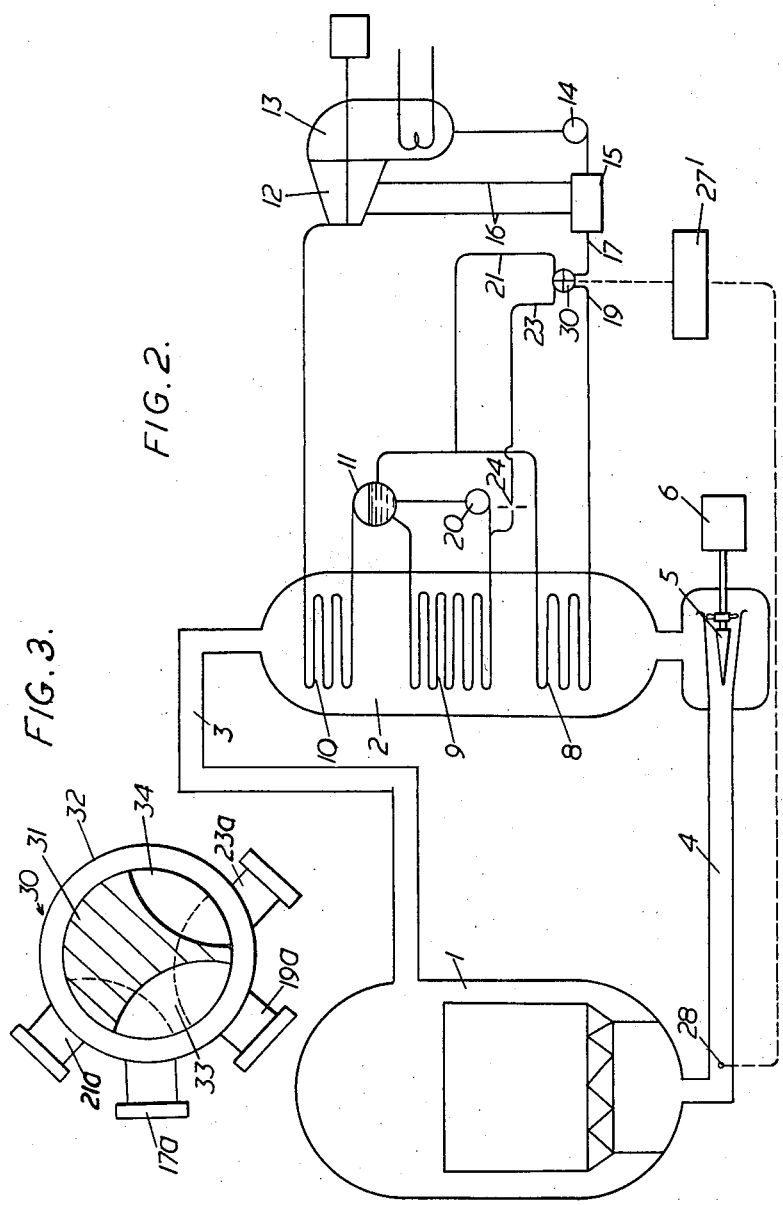
Inventors
Anthony J. Taylor
Norman G. Worley
By
Pennie, Edmonds, Morton, Barrows & Taylor
Attorneys

United States Patent Office 3,070,536
Patented Dec. 25, 1962

3,070,536
PLANT INCLUDING NUCLEAR REACTOR
Anthony J. Taylor and Norman G. Worley, London, England, assignors to Babcock & Wilcox Limited, London, England, a company of Great Britain
Filed Aug. 27, 1959, Ser. No. 836,361
Claims priority, application Great Britain Aug. 29, 1958
11 Claims. (Cl. 204—193.2)

This invention relates to plant including a gas-cooled nuclear reactor in which the coolant, after being heated in the reactor, is arranged to heat a vapour generator and subsequently an economiser before being recirculated to the reactor. As the load on the reactor falls, there is a tendency for the temperature of the coolant leaving the economiser to fall also. It is often objectionable that the temperature of coolant returned to the reactor should be dependent upon load and vary with it. It is, for instance, frequently desirable that the temperature of the coolant should remain constant and although proper design of the feed control means may counteract to some extent the tendency of the coolant temperature to vary, it is rarely entirely successful.

There are occasions, moreover, on which it is desirable that the temperature of the coolant at the inlet to the nuclear reactor should actually increase as the load decreases.

In certain reactors, for instance, there is a significant absorption of neutrons by xenon produced from previous nuclear reactions. When load is reduced, the amount of xenon in the reactor undergoes a transient increase and then falls again. If the increase in the amount of xenon is sufficiently large it can cause the reactor to shut down until the natural decay of the xenon has proceeded far enough to permit restarting. The shutting down, due to xenon poisoning, of reactors with positive temperature coefficients (i.e. those which gain reactivity with increase of temperature) can be avoided or the time for which the reactor must be shut down can be reduced, by increasing the temperature of the reactor in a controlled manner and the temperature of the coolant may be raised to this end. The reactivity gained by this temperature increase can be made to balance the loss in reactivity due to the xenon transient. The reverse situation obtains with reactors having a negative temperature coefficient of reactivity a greater reduction in the temperature of the coolant is desirable to offset the xenon transient.

A further advantage to be obtained from elevating the reactor coolant inlet temperature at low loads results from the more uniform working temperature level of the fuel elements thereby obtained. The elevation in coolant inlet temperature at part load offsets to some extent the natural fall in fuel element temperature with reducing load thus reducing the range of thermal cycling. This can prolong the life of uranium metal fuel elements which are prone to swelling due to thermal cycling.

The present invention is concerned particularly with plant including a gas-cooled nuclear reactor, vapour generating means, an economiser, means for passing coolant successively from the reactor to the vapour generating means, then to the economiser and subsequently back to the reactor, a separator drum, means for leading operating fluid from a source through the economiser to the separator drum and means for circulating operating fluid from the separator drum through the vapour generating means. In this specification, this plant will be referred to as plant of the kind described.

It is an object of the present invention to provide for the modification of the effect, in plant of the kind described, of falling load on the temperature of coolant returning to the reactor.

The present invention provides a method of operating plant of the kind described in which operating fluid from the separator drum is circulated at a variable rate through the economiser to adjust the temperature of the coolant entering the reactor.

The present invention also provides plant of the kind described having means for regulating the temperature of the coolant at the inlet to the nuclear reactor, the means including means for leading operating fluid from the liquid space of the separator drum through the economiser and temperature responsive means responsive to the temperature of coolant returning to the reactor and adapted to control the flow of operating fluid from the separator drum to the economiser.

By way of example, embodiments of the invention will now be described with reference to the accompanying drawings in which:

FIGURE 2 is a diagrammatic illustration of a modified form of the plant shown in FIGURE 1; and FIGURE 3 shows in transverse cross-section a valve incorporated in the plant illustrated in FIGURE 2.

Figure 1:
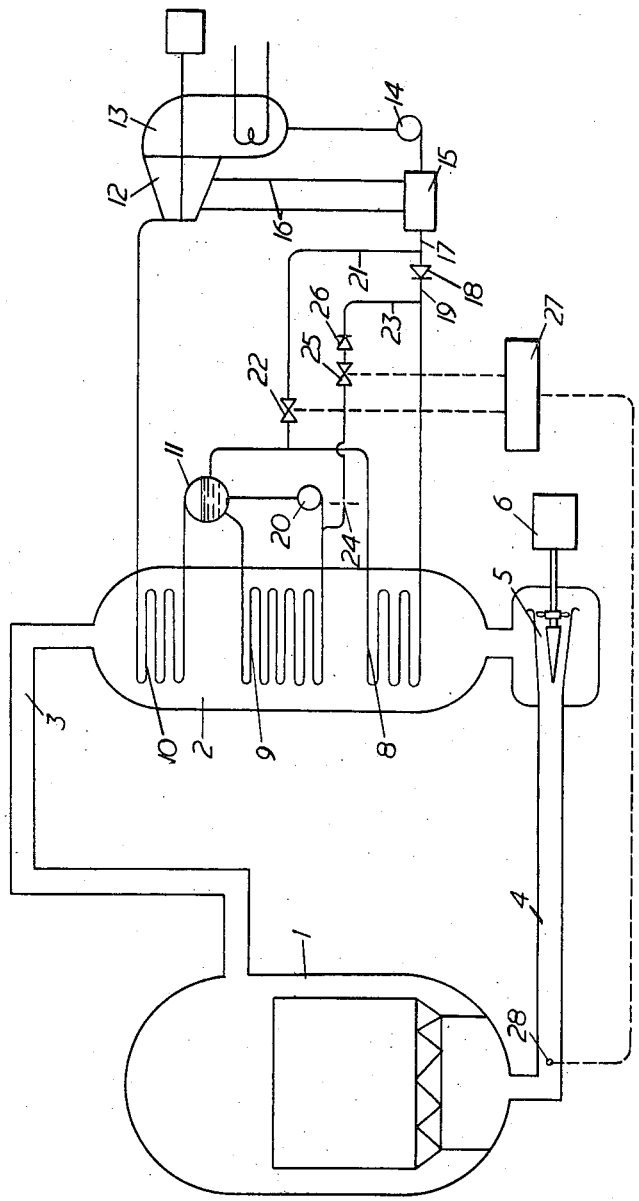
FIGURE 1 is a diagrammatic illustration of plant including a gas-cooled nuclear reactor, means for generating steam by use of the heat in the coolant, and a turbine driven by the steam.

The nuclear reactor 1 and the boiler 2 are connected together by means of the ducts 3 and 4, a pump 5, driven by the motor 6 is installed at the inlet end of the duct 4 and circulates a coolant gas, such as carbon dioxide in sequence along the duct 4, into the reactor 1, through the duct 3 and into the boiler 2. Coolant is withdrawn from the boiler 2 by the pump 5 and recirculated.

The boiler 2 contains the economiser tubes 8, the steam generating tubes 9 and the steam heating tubes 10.

A steam and water drum 11 is situated outside the boiler 2 and steam from the drum 11 passes through the steam heating tube 10, into the turbine 12. Expanded steam emerging from the turbine 12 passes through the condenser 13 and is passed by the feed pump 14 through the pre-heater 15. The pre-heater 15 is heated by steam bled off from the turbine 12 through the conduit 16. Fluid emerging from the pre-heater 15 will normally flow along conduit 17, through the non-return valve 18 and into the economiser 8 through the conduit 19. From economiser 8, the fluid passes to the drum 11.

Water from the drum 11 is circulated through the steam generating tubes 9 by the pump 20.

A conduit 21 by which the economiser 8 can be bypassed is connected across the economiser 8, between a point between the non-return valve 18 and the pre-heater 15 and a point between the economiser 8 and the drum 11. A control valve 22 is incorporated in the conduit 21.

By means of a conduit 23, hot water from the steam-and-water drum 11 can be circulated by the pump 20 through the economiser tubes 8 and by increasing the temperature of the economiser 8, the temperature of the coolant gas emerging from the boiler 2 can be increased. The conduit 23 includes the flow limiting means 24, the flow control valve 25 and the non-return valve 26. When the valve 25 is open, fluid will flow in parallel through the steam generating tubes 9 and the economiser tubes 8 between the circulating pump 20 and the drum 11.

The settings of the valves 22 and 25 are determined by a valve controller 27 which is controlled by a temperature-responsive device 28 located in the conduit 4 near the inlet to the reactor 1. Suitable forms of controller 27 and temperature responsive means 28 are well known and need not be described here.

The controller 27 is so arranged that as the temperature of the collant passing the temperature desponsive device 28 falls below a predetermined value, valve 22 is progressively opened to its maximum extent with the valve 25 closed. This will reduce the amount of cool fluid passing through the economiser tubes 8 and so increase their temperature. If the temperature of the coolant is still lower than desired, the valve 25 is then progressively opened so that hot water from the drum 11 flows through the economiser tubes 8.

The plant shown in FIGURE 2 differs from that shown in FIGURE 1 in that the separate valves 18, 22, 25 and 26 are replaced by a single valve 30 which increases, or decreases, the flows through the economiser by-pass 21 and feed-back conduit 23 simultaneously. The controller 27' will be a modified form of the controller 27 shown in FIGURE 1 since it controls only the one valve 30.

A suitable form of the valve 30 is shown in cross-section in FIGURE 3 and includes the recessed core 31 rotatable within the cylindrical sleeve 32. The sleeve 32 is provided with four openings 17a, 19a, 21a and 23a to which the conduits 17, 19, 21 and 23 are connected respectively. When the valve 30 has the setting shown in FIGURE 3, fluid flows from the pre-heater 15, through the inlet 17a, into the recess 33 and thence through the outlet 19a to the economiser. In this setting recess 34 is blind and the core 31 seals the opening 21a. As the temperature falls, the core 31 will be rotated in a clockwise direction simultaneously initiating and then increasing after a small dead movement the flow from the preheater 15 (through opening 17a) to the economiser by-pass 21 (through opening 21a), increasing the flow from the circulating pumps 20 (through opening 23a) to the economiser 8 (through opening 19a), and decreasing the flow from the preheater 15 (through opening 17a) to the economiser 8 (through opening 19a). When the core 31 reaches the extreme position shown by the broken lines in FIGURE 3, the pre-heater 15 is completely cut-off from the economiser 8, and fluid from the pre-heater 15 flows solely to the economiser by-pass 21 whilst fluid flows to the economiser 8 solely from the circulating pump 20.

It will be realised that the pump 20 must be such that it can provide adequate circulation through the vapour generating tubes 9 at full load. As the load falls, power from the pump 20 becomes available and this may be used for circulating fluid through the conduit 23 without increasing the pump rating of the plant.

It will also be realised that means for enabling fluid from the pre-heater 15 to by-pass the economiser tubes 8 may be omitted so that positive control of the coolant temperature can be effected only by means of the flow of operating fluid from the separator drum 11 through the economiser 8 by means of the conduit 23.

Additional control of the coolant temperature at the inlet to the reactor may be obtained by regulating the pressure of vapour generation in the tubes 9 in the manner disclosed in the complete specification of our British Patent No. 738,286.

If, as is usually the case, a plurality of boilers 2 are to be associated with one nuclear reactor 1, then each boiler 2 can be provided with its own means for passing liquid from a separator drum through the economiser and for causing operating fluid from the source to by-pass the economiser.

The invention may also be applied to plant in which the or each boiler contains a plurality of sections arranged to operate at different pressures and each section includes its own vapour generating tubes 9 and economiser tubes 8. An arrangement of this kind is shown in our British patent specification No. 738,286 and in such a case means, for passing liquid from a separator drum through the economiser and for causing operating fluid from a source to by-pass the economiser may be provided for any or each section. When such an arrangement is provided for only one section, the section will preferably be the largest so that the maximum effect is obtained. The largest section will normally operate at the highest pressure and lie upstream in the coolant flow of the other section or sections.

What is claimed is:
1. Plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; and means for regulating the temperature of the coolant at the inlet to the nuclear reactor, said means including means for leading operating fluid from the liquid space of the separator drum through the economiser and back to the separator drum, temperature responsive means responsive to the temperature of coolant entering the reactor, and means governed by the temperature responsive means to control the flow of operating fluid from the separator drum through the economiser.

2. Plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means including a circulating pump for passing operating fluid from the separator drum through the vapour generating means; and means for regulating the temperature of the coolant at the inlet to the nuclear reactor, said means including means for leading operating fluid from the outlet of the circulating pump through the economiser and back to the separator drum, temperature responsive means responsive to the temperature of the coolant entering the reactor, and means governed by the temperature responsive means to control the flow of operating fluid from the outlet of the circulating pump through the economiser.

3. Plant as claimed in claim 2 in which the means for leading operating fluid from the outlet of the circulating pump through the economiser includes flow-limiting means, a non-return valve and a flow control valve.

4. Plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; and means for regulating the temperature of the coolant at the inlet to the nuclear reactor, said means including means for leading operating fluid from the liquid space of the separator drum through the economiser and back to the separator drum, a by-pass connected to lead fluid from the source to the separator drum without passing through the economiser, temperature responsive means responsive to the temperature of coolant entering the reactor, and means governed by the temperature responsive means to control the flow of operating fluid from the separator drum through the economiser and the flow of fluid through the by-pass.

5. Plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means including a circulating pump for passing operating fluid from the separator drum through the vapour generating means; and means for regulating the temperature of the coolant at the inlet to the nuclear reactor, said means including means for leading operating fluid from the outlet of the circulating pump through the economiser and back to the separator drum, a by-pass connected to lead fluid from the source to the separator drum without passing through the economiser, temperature responsive means responsive to the temperature of coolant entering the reactor, and means governed by the temperature responsive means to control the flow of operating fluid from the outlet of the circulating pump through the economiser and the flow of fluid through the by-pass.

6. Plant including a gas-cooled nuclear reactor; vapour generating means; an economiser; means for pasing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; and means for regulating the temperature of the coolant at the inlet to the nuclear reactor, said means including means for leading operating fluid from the liquid space of the separator drum through the economiser and back to the separator drum, a by-pass connected to lead fluid from the source to the separator drum without passing through the economiser, a single valve device simultaneously controlling the flow of operating fluid through the by-pass and the flow of fluid from the separator drum through the economiser and being such that operation in one sense increases simultaneously both flows and operation in the opposite sense simultaneously decreases both flows, temperature responsive means responsive to the temperature of coolant entering the reactor, and means governed by the temperature responsive means to determine the setting of the single valve device.

7. Plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means including a circulating pump for passing operating fluid from the separator drum through the vapour generating means; and means for regulating the temperature of the coolant at the inlet to the nuclear reactor, said means including means to for leading operating fluid from the outlet the circulating pump through the economiser and back to the separator drum, a by-pass connected to lead fluid from the source to the separator drum without passing through the economiser, a single valve device simultaneously controlling the flow of operating fluid through the by-pass and the flow of fluid from the separator drum through the economizer and being such that operation in one sense increases simultaneously both flows and operation in the opposite sense simultaneously decreases both flows, temperature responsive means responsive to the temperature of coolant entering the reactor, and means governed by the temperature responsive means to determine the setting of the single valve device.

8. A method of controlling the operation of plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the generating means; the method comprising the steps of circulating operating fluid from the separator drum through the economiser and back to the separator drum and controlling the rate of said circulation to adjust the temperature of the coolant entering the reactor.

9. A method of controlling the operation of plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; the method comprising the steps of circulating operating fluid from the separator drum through the economiser and back to the separator drum, causing a variable controlled proportion of the operating fluid flowing from the source to by-pass the economiser, and controlling said proportion and the rate of said circulation to adjust the temperature of the coolant entering the reactor.

10. A method of controlling the operation of plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; the method comprising the steps of causing a variable controlled proportion of the operating fluid flowing from the source to by-pass the economiser, controlling said proportion to adjust the temperature of the coolant entering the reactor, and circulating operating fluid from the separator drum through the economiser and back to the separator drum when the flow of operating fluid from the source through the economiser has substantially ceased, and controlling the rate of said circulation to adjust the temperature of the coolant entering the reactor.

11. A method of controlling the operation of plant including a gas-cooled nuclear reactor; vapour generating means; an economiser; means for passing coolant successively through the reactor, the vapour generating means and the economiser; means for returning coolant from the economiser to the reactor; a separator drum; a source of operating fluid; means for leading operating fluid from the source through the economiser to the separator drum; means for passing operating fluid from the separator drum through the vapour generating means; the method comprising the steps of causing a variable controlled proportion of the operating fluid flowing from the source to by-pass the economiser, circulating operating fluid from the separator drum through the economiser and back to the separator drum, and adjusting the temperature of the coolant entering the reactor by varying simultaneously in the same sense said proportion and the rate of said circulation.

References Cited in the file of this patent

UNITED STATES PATENTS

| | | |
|---|---|---|
| 2,952,602 | Wooton | Sept. 13, 1960 |
| 2,957,815 | Pacault et al. | Oct. 25, 1960 |

FOREIGN PATENTS

| | | |
|---|---|---|
| 1,134,988 | France | Dec. 10, 1956 |
| 557,057 | Italy | Feb. 12, 1957 |
| 778,941 | Great Britain | July 17, 1957 |